Dec. 5, 1933.   J. E. JOHNSON   1,937,896
PNEUMATIC SPRING AND A MANNER OF APPLYING SAME
Filed Aug. 11, 1930   5 Sheets-Sheet 1

Inventor
Julian E. Johnson
by J. Daniel Stuwe
Attorney.

Dec. 5, 1933.    J. E. JOHNSON    1,937,896
PNEUMATIC SPRING AND A MANNER OF APPLYING SAME
Filed Aug. 11, 1930    5 Sheets-Sheet 3

Inventor
Julian E. Johnson
by J. Daniel Stuwe
Attorney.

Dec. 5, 1933.    J. E. JOHNSON    1,937,896
PNEUMATIC SPRING AND A MANNER OF APPLYING SAME
Filed Aug. 11, 1930    5 Sheets-Sheet 4
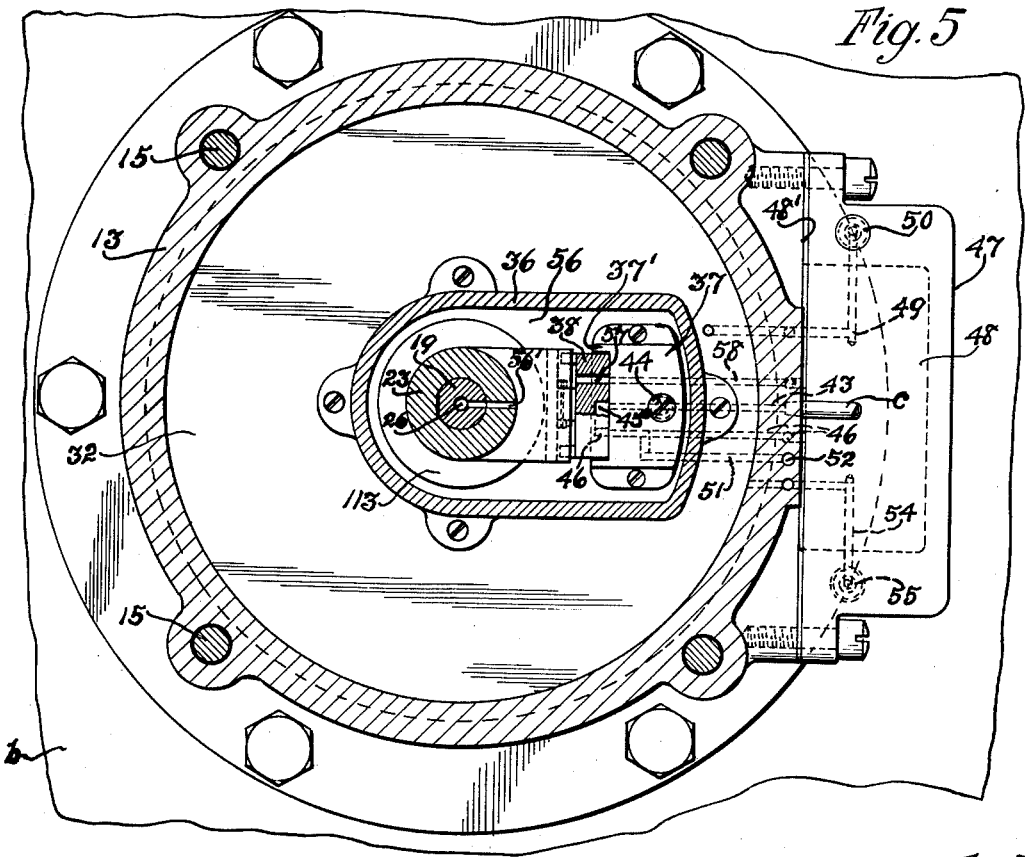
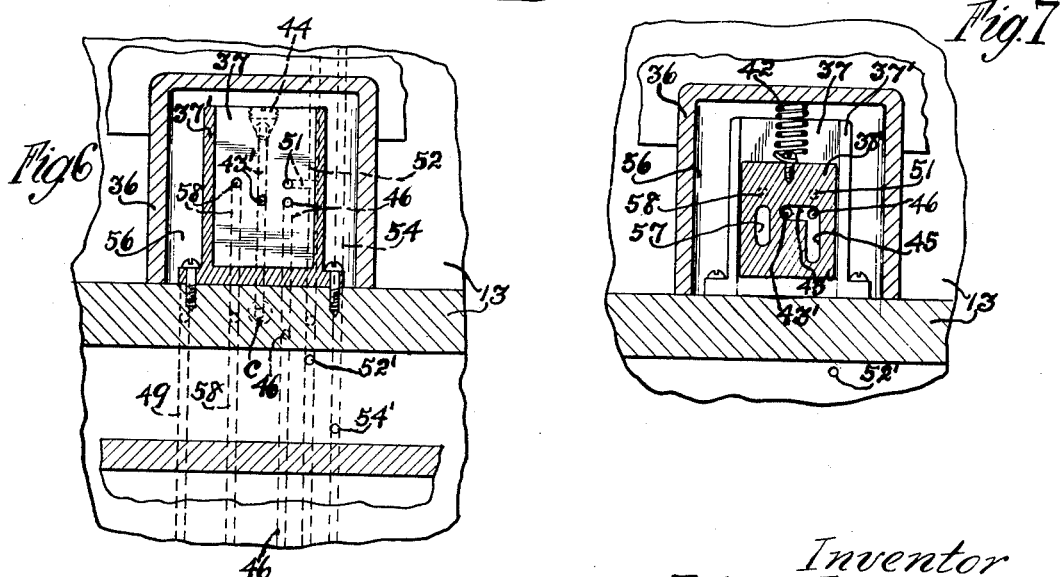
Inventor
Julian E. Johnson
by J. Daniel Stuwe
Attorney.

Dec. 5, 1933. J. E. JOHNSON 1,937,896
PNEUMATIC SPRING AND A MANNER OF APPLYING SAME
Filed Aug. 11, 1930 5 Sheets-Sheet 5
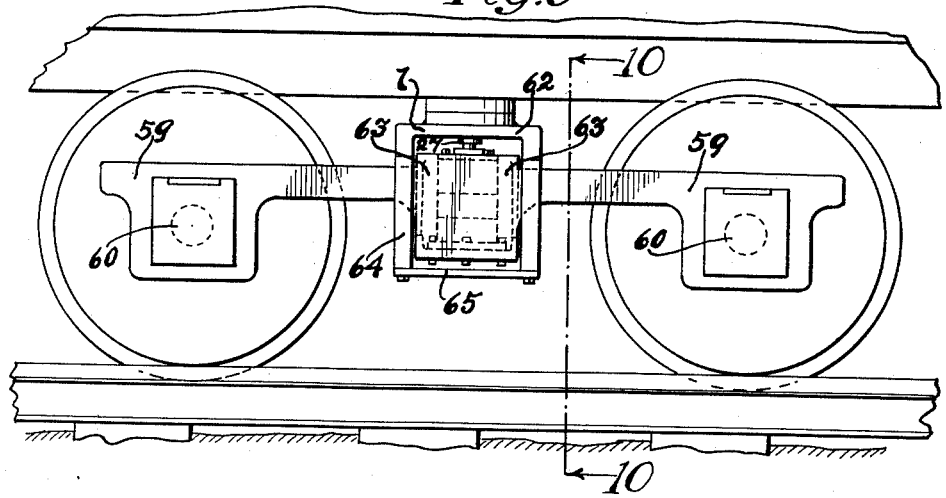
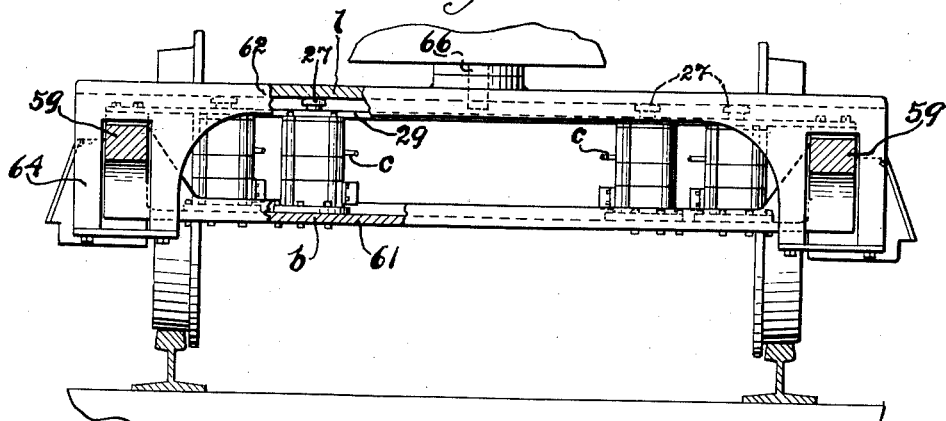
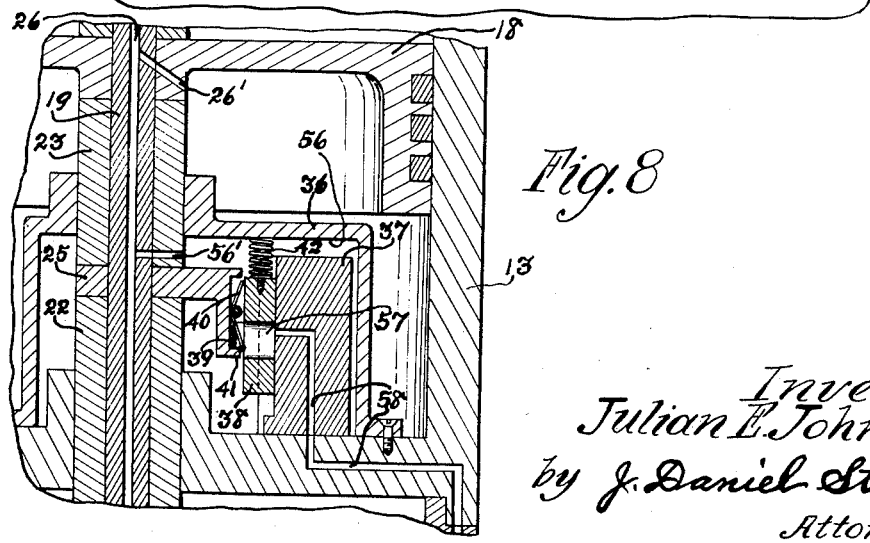
Inventor
Julian E. Johnson
by J. Daniel Stuwe
Attorney.

Patented Dec. 5, 1933

1,937,896

UNITED STATES PATENT OFFICE 1,937,896

PNEUMATIC SPRING AND A MANNER OF APPLYING SAME

Julian E. Johnson, Chicago, Ill.

Application August 11, 1930. Serial No. 474,405

16 Claims. (Cl. 267—64)

This invention relates to a new and improved pneumatic spring and a manner of applying same.

One of the chief objects of this invention is to provide a pneumatic supporting device which has multiplied supporting power, and which preferably comprises a plurality of superposed pistons mounted on a single stem and housed in a cylinder which includes a plurality of superposed sections.

Another object of this invention is to provide a pneumatic supporting device which is so constructed and arranged that its supporting or lifting pressure will be adapted to the load supported by the device.

Still another object is to provide a pneumatic supporting device comprising compression chambers and means associated therewith for supporting and lifting a load, and including means for automatically controlling and adjusting the pressure within said chambers in accordance with the particular load supported.

A further object is to provide the compression chambers with a sealing liquid, and to provide means for automatically returning the sealing liquid to said compression chambers whenever it escapes therefrom.

Another object is to provide an improved pneumatic supporting mechanism and a manner and means for applying the same, preferably to a car; so as to provide a steady and uniform cushioning support for the car, and whereby to avoid the continuous and injurious vibrations that prevail with the usual metallic supporting springs.

These and other objects and advantages are attained with this invention, as will become apparent from the following description, taken in connection with the accompanying drawings, in which,—

Fig. 5 is a horizontal cross-sectional view, taken on line 5—5 of Fig. 2.

Figure 2:
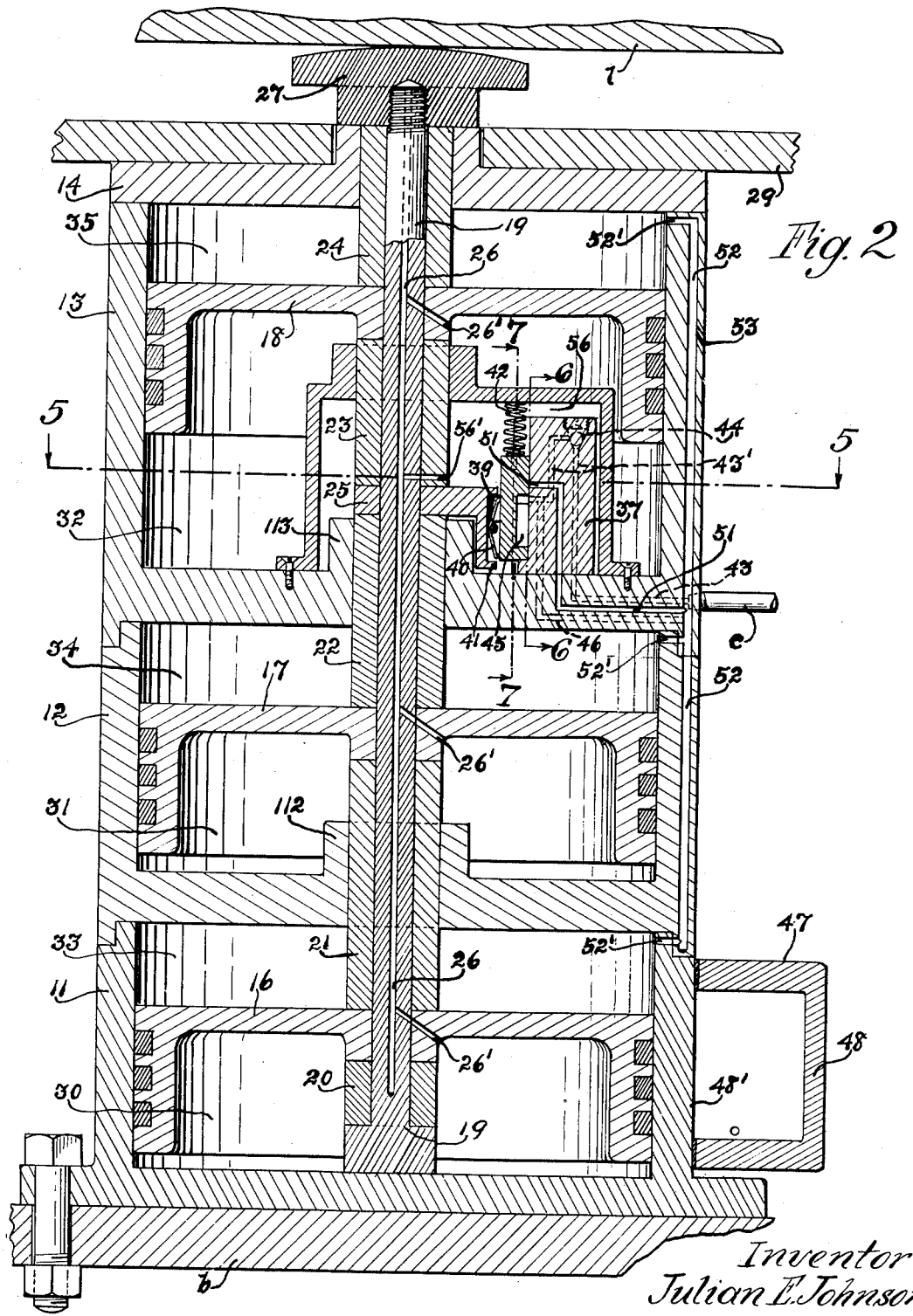
Fig. 2 is a vertical sectional view of this pneumatic spring, taken on line 2—2 of Fig. 1.

Figs. 6 and 7 are detail vertical sectional views, taken on lines 6—6 and 7—7 of Fig. 2, illustrating the valve mechanism in charging position.

Figure 1:
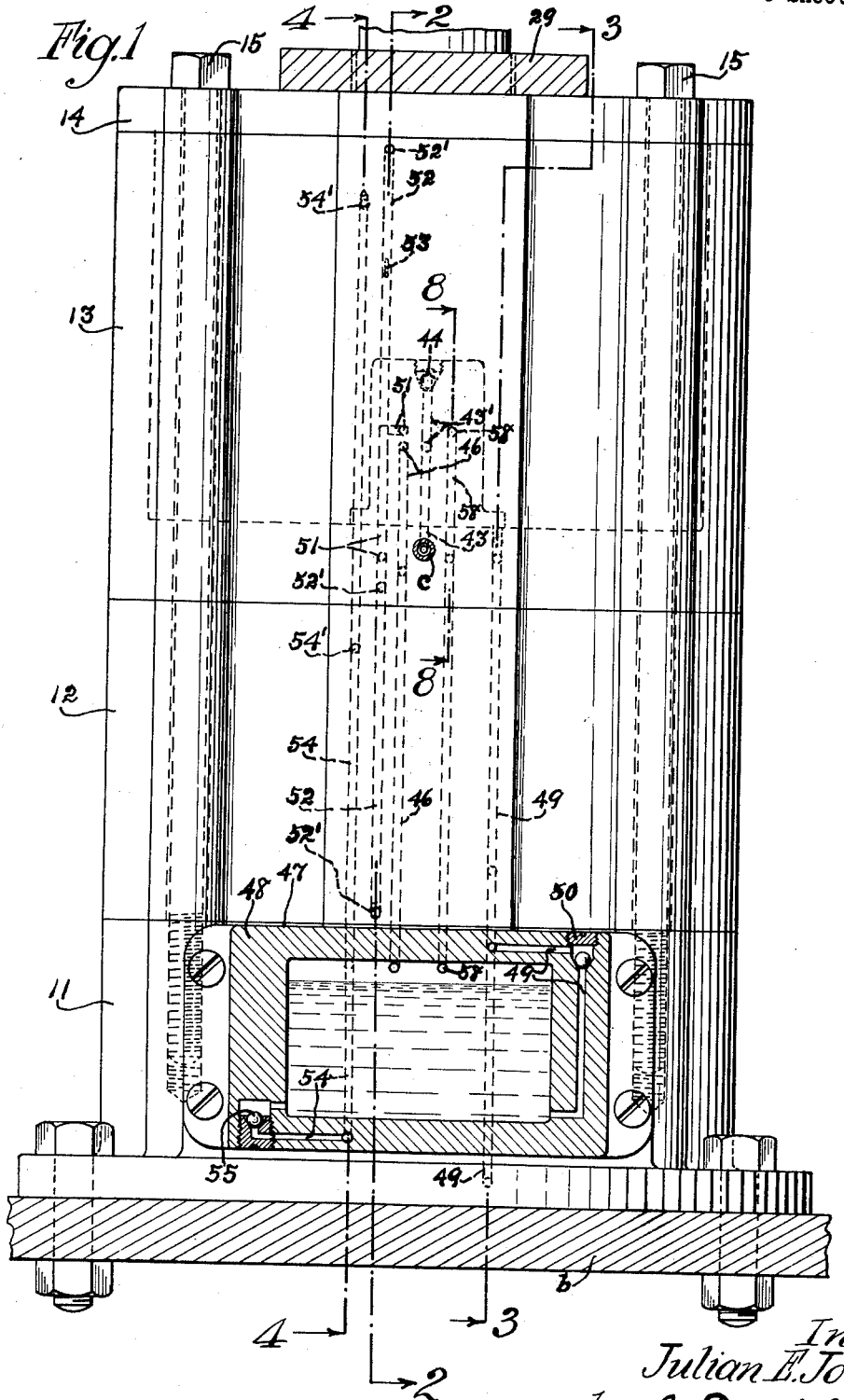
Fig. 1 is a side elevational view of my improved pneumatic spring, showing the oil well in section.

Fig. 8 is a detail vertical sectional view, taken on line 8—8 of Fig. 1, illustrating the valve mechanism in the exhaust position.

Fig. 9 is a partial side view of a railway car having my improved pneumatic supporting device mounted in supporting position thereon, and illustrating one manner of applying this device.

Fig. 10 is a vertical cross-sectional view thereof, taken on line 10—10 of Fig. 9.

In the drawings my invention is illustrated in its preferred form of construction, which comprises a cylinder including sections 11, 12, and 13, substantially pot-shaped in form, and a top or cover 14. These sections have stepped connections and are in superposed relation, the connections being made air-tight, and said sections are securely held together by suitable bolts 15, as best shown in Fig. 1.

A plurality of pistons, 16, 17, and 18, are positioned in the cylinder, one in each cylinder section, said pistons being mounted on a stem 19, and spacing collars 20, 21, 22, 23, and 24 are mounted on said stem for spacing said pistons. Between collars 22 and 23 a valve operating member 25 is mounted on the stem. Said stem is preferably made angular in cross-section or is arranged so that the elements mounted thereon cannot rotate to destroy registry with a passage 26 provided longitudinally through said stem and the passages 26' extending therefrom through the stem and through the pistons, as shown in Fig. 2. Said pistons, collars, and operating member are securely held on the stem, between the head of the stem at the bottom and a cap-like nut or cap 27 which is threaded on the top of the stem.

The cylinder is bolted or secured upon a base member "b", and is spaced and steadied by a spacing member or bar 29 at the top. The load "l" which is to be supported on the device rests slidably upon the slightly rounded top of the cap or nut 27.

This pneumatic spring or supporting device contains a compression chamber beneath each piston, the same being indicated at 30, 31, and 32; and an atmospheric chamber above each piston, the same being indicated at 33, 34, and 35.

A slide-valve housing 36 is secured to the floor of the upper cylinder section 13; and within this housing, and also secured to said floor, is a valve block 37. The side or face of this block adjacent the stem is recessed vertically providing side ribs 37' between which a slide-valve 38 is guided in its vertical motion. A lug 39 extends from the slide-valve toward the stem, being grooved vertically along its center to provide a vertical path for the conventional slide-valve spring 40 to slide in.

The slide-valve 38 is moved upwardly along with the upward movement of the stem, by means of a lug 41 provided at the bottom of the valve operating member 25 engaging under the lug 39 on the slide-valve. A spring 42 normally urges the slide-valve down into its lower and operative position, as indicated in Fig. 2, said spring being compressible by the upward movement of the stem and the lug 41, to move the valve into the exhaust position, as indicated in Fig. 8.

Each compression chamber is filled with a suitable sealing liquid, preferably oil, and so much thereof is placed in each chamber as it will hold in the collapsed or inoperative position of the device. This oil or sealing liquid may be placed in the cylinder section before the piston is inserted therein, during the assembly of the pneumatic device; or it may be forced in through the top of passage 26 in the stem, before its cap 27 is screwed thereon. The object of said sealing liquid is to prevent escape of compressed fluid, such as air, past the pistons to the atmosphere chambers. Naturally this sealing effect is not needed while the pistons are at exhaust levels. Therefore the piston skirts are preferably of such length with respect to the quantity of the sealing liquid that they will remain immersed during the charging and the riding or lap positions of the spring, but not during exhaust position. Since the sealing fluid is forced past the bearing surfaces of the pistons, it is desirable that it should possess not only sealing quality but lubricating quality as well, wherefore oil is preferred as a suitable sealing fluid.

Compressed air from a suitable source of supply enters the pneumatic supporting device through a suitable supply conduit "c", flowing therefrom through a passage 43 provided in the floor of the cylinder section 13, and up through a registering passage 43' provided in the valve block 37, past a ball check-valve 44 therein, and thence to the slide-valve seat between ribs 37'. Said check-valve 44 prevents any violent deflation of this pneumatic device, in case of a rupture in the supply conduit "c", or the like.

As best shown in Figs. 2 and 7, which illustrate the slide-valve in the charging or operative position, this valve is provided with a vertically extending groove 45 and a branch groove 45' extending horizontally therefrom and connecting the supply passage 43' with a passage 46 which leads, as best shown in Fig. 5, outwardly to the side wall of the cylinder and then downwardly therethrough, as further shown in Figs. 1 and 6, into an oil return well or reservoir 47 which includes a casing 48 secured with suitable screws to a flat part 48' on the lower cylinder section 11. Suitable packing is provided between said casing and said flat part to form an air-tight connection.

Figure 3:
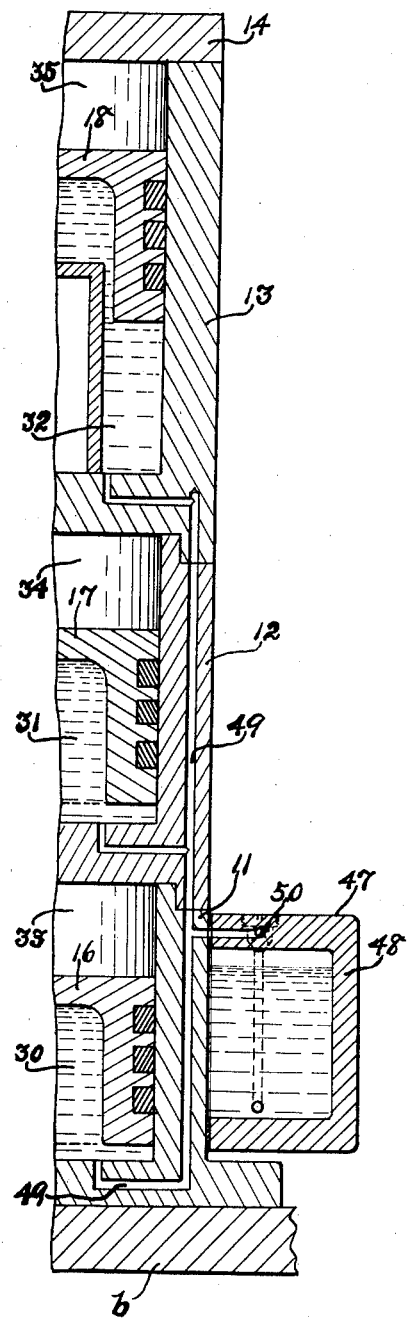
Fig. 3 is a partial sectional view of the pneumatic spring, showing the charging passages leading from the oil well to the compression chambers.
Figure 4:
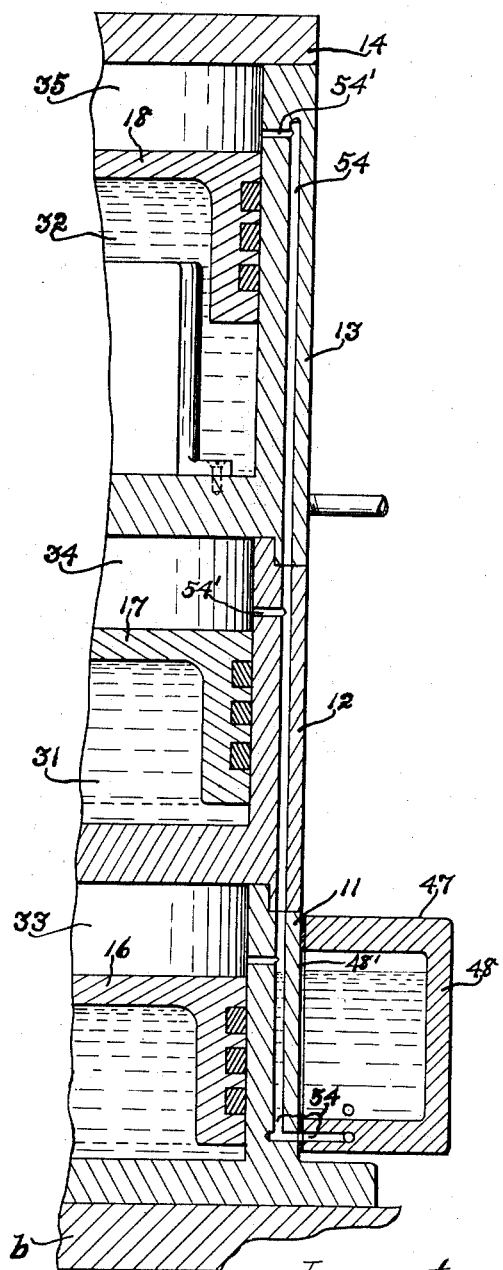
Fig. 4 is a partial sectional view, showing the passages for enabling sealing liquid to return from above the pistons back into the oil well.

In charging the device, compressed air enters the reservoir 47 at the top, through passage 46. Any oil present in the reservoir is then forced down under pressure and out through passage 49, past ball check-valve 50 therein, and through the floor of each section, into each compression chamber, as best shown in Fig. 3. The ball check-valve 50 prevents pressure from the compression chambers to return to the oil reservoir during other positions of this pneumatic device than the charging position, as during such other positions this reservoir has only atmospheric pressure therein.

When any oil which may have been present in the reservoir has been forced out therefrom, it is followed by the compressed air until the pistons rise, thereby carrying upwards the stem 19 and the valve operating member 25 thereon, until lug 41 engages and carries with it lug 39 on the slide-valve and thereby lifting the valve, and thereby next breaking the registry of supply passage 43' with oil return passage 46 which leads to the reservoir, since the branch groove 45', as best observable from Fig. 7, is then moved above said passages. In this position of the movable parts of this pneumatic device, which may be termed the lap position, because the supply passage 43' is blanked, the vertically extending groove 45 in the slide-valve, see Fig. 7, also Figs. 2 and 6, will connect the return passage 46 with an atmosphere passage 51 leading through the valve block and the floor of section 13, into an atmosphere passage 52 extending vertically in the wall of the cylinder, and out through a choke port or restricted passage 53 leading therefrom into the atmosphere. Such registry persists during lap and also during the upper or exhaust position of the parts, so that this device has atmospheric pressure in the reservoir during lap and exhaust positions.

During charging position, when the piston begins to lift, the atmospheric chambers above the pistons would have the air therein compressed due to the decrease of volume, and therefore branch atmosphere passages 52' are extended from the upper part of each of said atmospheric chambers, to passage 52, to exhaust the air therefrom through choke port 53. Said passage 53 is restricted, so that if a jolt should force the pistons violently upwards, the escape of the air from the atmospheric chambers will be slow, and a pressure will be developed which will resist the sudden up-throw of the pistons. When the pistons are forced violently downward, the atmosphere chambers increase in volume and tend to draw in air from the atmosphere through choked port 53; this ingress of air is so restricted that the pressure in the atmospheric chambers is temporarily reduced below atmospheric pressure. In this way the atmosphere chambers resist sudden downward movements as well as sudden upward movements of the pistons.

Provision is made that if oil escapes from the compression chambers under pressure around the pistons into the atmospheric chambers, and such leakage is even desirable for lubricating purposes, the oil will be returned to said compression chambers. Such escaped oil enters from the atmospheric chambers through branch return passages 54', provided in the intermediate parts of said chambers, into an oil return passage 54 which leads through the cylinder wall down to the oil reservoir 47, a ball check valve 55 being provided in said passage 54 to prevent oil returning upward through said passage during charging position, and while the oil in the reservoir is under pressure. The amount of leakage past the pistons may be regulated by the selection of the particular grade or thickness of oil used in the device. The ball of this check valve is of light weight and lifts for the oil to pass during lap and exhaust positions.

The various compression chambers are in constant communication, by means of the vertical passage 26 in the stem, and the branch passages 26' extending therefrom downwardly into the chambers, as best shown in Fig. 2. The chambers are also in constant communication with the slide-valve chamber 56 in the slide-valve housing 36, by means of the passage 56' leading from the stem passage 26 into said chamber 56.

When the stem moves up to exhaust position, as by a diminishing of the load supported thereon, the valve operating means 25, by its lug 41 pressing against slide-valve lug 39, moves the valve upwards, until a slot 57, which is provided through the valve, permits the air and the oil to pass from the slide-valve chamber 56, through said slot 57, and therefrom through a passage 58 which leads through the valve block and through the cylinder down into the oil reservoir 47. See Figs. 1, 7, and 8. By exhausting the oil from the slide-valve chamber into the reservoir, instead of directly into the atmosphere, the oil is saved which may be exhausted from said chamber, during the exhausting of the air therefrom.

As the air and oil together are exhausted from the slide-valve chamber to the reservoir, the oil settles to the bottom of the reservoir, and the air moves to the top and out through passage 46 at the top of said reservoir, back to the slide-valve, through slot 45 in said valve, into atmosphere passage 51, then through atmosphere passage 52, and out through the choke port 53 into the atmosphere.

When this device, then located in its upper or exhaust position, has been sufficiently exhausted, the stem, pistons, and valve operating means move downward; and as the lug 41 recedes from slide-valve lug 39, the valve-return spring 42 moves the valve back to lap position, intermediate the exhaust and the charging positions. When thereafter, through increase of the load on this device, or through leakage of the oil or sealing fluid past the pistons into the atmospheric chambers, etc., the pistons, stem, and operating means are still further depressed, this device is then moved automatically into the lower or charging position, and this device is then automatically charged further, to adapt itself or to compensate for any increase of load, by a similar increase of compressed air and consequent increase of upward buoyancy of the pistons and stem and thereby of the load supported thereon.

The floors of the cylinder sections 12 and 13 are cupped centrally, as shown at 112 and 113, around the spacing collars 21 and 22 on the stem 19, to reduce leakage of oil by providing a greater bearing surface between said cupped portions and the collars. Other suitable packing means may be employed, if preferred.

In Figs. 9 and 10 is illustrated a manner or method of mounting or applying my improved pneumatic spring on a railway car. In this car the side frame 59 rests on the journal 60; and the bolster of the car includes a fixed lower portion 61 and an upper floating portion 62. The portion 61 is fixed at each end to the side frame 59, and provides the base member "b" in this case for four pneumatic springs. A spacing bar 29 extends across all four pneumatic springs, and is fastened at each end to the side frame 59. The floating portion 62 provides the load "l" in this case, and rests upon the heads or caps 27 secured on the tops of the stems. Said portion 62 is mounted at each end on a lug or extension 63 integral with the side frame 59. Pedestal jaws 64 extend downward from the floating portion 62 and have retaining bars 65 secured to their lower ends. Said pedestal jaws 64 fit around lugs 63 and permit the floating bolster only an up and down or vertical movement with relation to the side frames of the truck. The car body is fastened to the floating bolster portion 62 by means of the usual king pin 66.

These pneumatic supporting springs provide a steady and uniform cushioning support for the car truck, and avoid the usual injurious vibrations that are present with the customary metallic supporting springs.

I claim as my invention:

1. A pneumatic spring comprising piston means enclosed in cylinder means, chamber means on the opposite faces of said piston means, one of said chamber means being provided with restricted passage means whereby to communicate with the atmosphere, the other of said chamber means being adapted to receive and contain compressed fluids and constituting pressure chamber means, piston skirts of rigid but thin construction provided on said piston means, and sealing fluid in said pressure chamber means, the length of said piston skirts and the level of said sealing fluid being such that the skirts will be immersed in sealing fluid throughout charging and riding positions of the spring so that any escape past said piston means will be of sealing fluid and not of compressed fluid.

2. A pneumatic spring comprising piston means inclosed in cylinder means, chamber means on opposite sides of said piston means, one of said chamber means being provided with restricted passage means communicating with the atmosphere, the other of said chamber means being adapted to receive and contain compressed air and being pressure chamber means, said piston means having depending skirts of thin but rigid construction, oil in said pressure chamber means, the length of said piston skirts and the quantity of said oil being such that the skirts will be immersed in oil throughout all but exhaust positions of the spring so that any escape past said piston means will be of oil and not air, and means for automatically returning said escaped oil to said pressure chamber means.

3. A pneumatic spring comprising piston means inclosed in cylinder means, chamber means on the opposite faces of said piston means, restricted passage means providing one of said chamber means communication with the atmosphere, the other of said chamber means being adapted to contain compressed fluid and constituting pressure chamber means, channel means through which said pressure chamber means may be supplied with compressed fluid, valve means inclosed within said cylinder means and adapted to control flow of fluid through said channel means, and means within said cylinder means whereby said valve means is operated in harmony with the position and the movement of said piston means within said cylinder means.

4. A pneumatic spring comprising piston means inclosed in cylinder means, chamber means on each side of said piston means, restricted passage means providing one of said chamber means communication with the atmosphere, the other of said chamber means being adapted to contain compressed fluid and being pressure chamber means, channel means through which said pressure chamber means may be supplied with compressed fluid, valve means inclosed within said cylinder means and adapted to control flow of fluid through said channel means, and means within said cylinder means whereby said valve means is operated in harmony with the position and movement of said piston means, said valve means including snugly fitting valve parts, and spring means for holding said valve parts snugly together in position and in substantially leak-proof relation regardless of wear thereof.

5. A pneumatic spring comprising piston means inclosed in cylinder means, chamber means on the opposite faces of said piston means, passage means providing one of said chamber means with communication with the atmosphere, the other of said chamber means being adapted to contain compressed fluid and being a pressure chamber means, channel means through which said pressure chamber means may be supplied with compressed fluid, valve means within said cylinder means and adapted to control flow of fluid through said channel means, means within said cylinder means whereby said valve means is actuated by the movement of said piston means, said piston means having depending skirts of thin but rigid construction, and oil in said pressure chamber means, the length of said piston skirts and the quantity of said oil being such that the skirts will be immersed in oil thruout all but exhaust positions of said spring so that any escape past said piston means will be of oil and not of compressed fluid.

6. A pneumatic spring comprising piston means inclosed in cylinder means, chamber means on the opposite faces of said piston means, restricted passage means providing one of said chamber means with communication with the atmosphere, the other of said chamber means being adapted to contain compressed fluid and being a pressure chamber means, channel means through which said pressure chamber means may be supplied with compressed fluid, valve means within said cylinder means and adapted to control flow of fluid through said channel means, means within said cylinder means whereby said valve means is actuated by the movement of said piston means, said piston means having depending skirts of thin but rigid construction, oil in said pressure chamber means, the length of said piston skirts and the quantity of said oil being such that the skirts will be immersed in oil throughout charging and riding positions of said spring so that in these positions any escape past said piston means will be of oil and not compressed fluid, and means for automatically returning said escaped oil to said chamber pressure means.

7. A pneumatic spring comprising cylinder means, piston means therein, chamber means on one side of said piston means and being adapted to receive compressed fluid, sealing fluid in said chamber means so that any escape past said piston means will be of sealing fluid and not compressed fluid, valve means operable by the movement of said piston means whereby compressed fluid is admitted to said chamber means in an amount adapted to support the load imposed on the device, valve means operable by the movement of said piston means whereby a suitable amount of compressed fluid is exhausted from said chamber means when the lifting power of the device is more than required for the load then imposed, and means for preventing the exhaust and loss of said sealing fluid along with the exhaust of said compressed fluid.

8. A pneumatic supporting device comprising a cylinder including a plurality of superposed pot-shaped sections secured together, a plurality of pistons mounted one in each of said sections, thereby providing two series of chambers on the two opposite faces of said pistons, a stem on which said pistons are mounted to move therewith, one of said series of chambers having communication with the atmosphere, and means actuated by the movement of said stem for admitting fluid under pressure to the other series of chambers and moving said pistons and stem into supporting position.

9. A pneumatic supporting device comprising a cylinder including a plurality of superposed pot-shaped sections secured together, a plurality of pistons mounted one in each of said sections, thereby providing two series of chambers on the two opposite faces of said pistons, a stem on which said pistons are mounted to slide therewith in said cylinder, there being passages connecting the chambers in each series, one of said series having its passages in open communication with the atmosphere, the other of said series and its passages being arranged for receiving compressed fluid means, and valve means actuated by the movement of said stem and pistons to their collapsed position, for opening said last recited passages to the flow of said compressed fluid means into said last recited chambers to move said pistons and stem to the extended, supporting position.

10. A pneumatic supporting device comprising cylinder means, piston means mounted therein, a stem secured to and movable with said piston means and having a supporting member at its upper end for supporting a load, chamber means above said piston means and being in communication with the atmosphere, chamber means below said piston means being provided with channel means for conducting fluid under pressure thereto, and slide valve means enclosed within said cylinder means for controlling said fluid conducting means in harmony with the load supported by the device, said valve means including a valve seat and a valve face snugly fitting the same, and spring means for holding said face snugly against said seat and in substantially leak-proof relation regardless of wear thereof.

11. A pneumatic supporting device comprising cylinder means, piston means in said cylinder means, a stem secured to and movable with said piston means and having a supporting cap at its upper end for supporting a load, atmospheric chamber means above said piston means and channel means placing the same in communication with the atmosphere, chamber means below said piston means and being provided with channel means for conducting fluid under pressure thereto, valve means in said cylinder means, said valve means including a valve seat and a valve face snugly fitting the same, spring means for holding said face snugly against said seat and in substantially leak-proof relation regardless of wear thereof, and means on the stem for actuating said valve means by the movement of the stem and piston means, to adapt the lifting pressure of the device to the weight of load supported upon said cap.

12. A pneumatic supporting device comprising a cylinder including a plurality of superposed sections secured together and having bottoms for separating the sections, a plurality of pistons mounted one in each section, a stem on which said pistons are mounted to move therewith, means on the upper end of said stem for supporting a load, chambers between the upper faces of said pistons and the lower faces of said bottoms, channels connecting them with the atmosphere to provide a series of atmospheric chambers, chambers between the lower faces of the pistons and the upper faces of said bottoms, a conduit for supplying fluid under pressure, channels leading from said conduit to the last said chambers to provide a series of compression chambers, and a slide-valve interposed in said channels within the cylinder and being operable automatically by the movement of said stem, to adapt the lifting pressure of the supporting device to the weight of the load supported thereby.

13. A pneumatic supporting spring comprising a cylinder containing a piston, a compression chamber on one side of said piston and an atmosphere chamber on the other side of said piston, said atmosphere chamber being provided with a restricted passage connecting it with the atmosphere, an oil-return reservoir, channel means permitting oil to move from the atmosphere chamber into the oil-return reservoir and being provided with valve means to prevent backflow, channel means permitting oil to move from the oil return reservoir into the compression chamber and being provided with valve means to prevent backflow, valve means operable by the piston stem whereby the oil-return reservoir is rendered open to the atmosphere when the spring is not in charging position, the oil from the atmosphere chamber being forced into the oil-return reservoir when said reservoir has only atmospheric pressure, and valve means operable by the stem for disconnecting the oil-return reservoir from the atmosphere and connecting it with a supply passage so that compressed air from a supply source flows through the oil-return reservoir to the compression chamber to propel oil from the former to the latter whence it originally escaped.

14. A pneumatic supporting device comprising a cylinder including a plurality of sections superposed and secured together, a plurality of pistons mounted one in each section, a stem on which said pistons are secured, a series of compression chambers below the pistons, a series of atmospheric chambers above the pistons, means on top of the stem above the cylinder for supporting a load thereon, passages connecting the atmospheric chambers with the atmosphere, a reservoir and valve-controlled passages connecting it with said atmospheric chambers for conveying sealing fluid to said reservoir which has escaped past the pistons into said atmospheric chambers, valve-controlled passages connecting the compression chambers with said reservoir, means for conveying compressed air into the device, and a valve actuated by the movement of said stem for regulating the admittance of compressed air to said reservoir and said compression chambers and thereby controlling the supporting power of the device in accordance with the load supported.

15. A pneumatic supporting device comprising a cylinder including a plurality of superposed pot-shaped sections secured together, a plurality of pistons mounted one in each of said sections, a stem on which said pistons are mounted in spaced relation and slidable therewith in the cylinder, means on top of the stem above the cylinder for supporting a load thereon, a series of atmospheric chambers above the pistons and passages connecting them with the atmosphere, an oil reservoir, a set of return passages connecting said reservoir with said atmospheric chambers, a second set of passages connecting said reservoir with said compression chambers, valve means operated by the movement of the stem when in the lower or charging position, whereby compressed air is admitted to the oil reservoir and therefrom to the compression chambers for lifting the pistons and stem and load thereon, said valve moving into lap and into exhaust positions by the rising of said stem and the reservoir thereby being placed in communication with the atmosphere, valve means in the set of passages leading from the reservoir to the compression chambers to prevent fluid under pressure from returning from these chambers to the reservoir while said reservoir is at atmospheric pressure, and valve means in said set of return passages which lead from the atmospheric chambers to the reservoir for preventing flow of compressed fluid from the reservoir back into these chambers during charging position of the device.

16. An air spring comprising cylinder means, connected piston and stem means within said cylinder means, slide valve means fully housed and protected within said cylinder means, said slide valve means including a valve face and a valve seat snugly fitting the same, spring means for holding said face snugly against said seat and in substantially leak-proof relation regardless of wear between said face and seat, and means on said stem means for actuating said slide valve means by the movement of said stem and piston means, thereby adapting the lifting pressure of the device to the weight of the load supported thereon.

JULIAN E. JOHNSON.